(12) United States Patent
Lee et al.

(10) Patent No.: US 8,868,138 B2
(45) Date of Patent: Oct. 21, 2014

(54) METHOD FOR CONTROLLING LOW-POWER STATE IN MOBILE HANDSET

(75) Inventors: Hoo-Sung Lee, Daejon (KR); Seong-Su Park, Daejon (KR); Byung-Jo Kim, Daejon (KR); Sung-Rae Cho, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1194 days.

(21) Appl. No.: 11/860,595

(22) Filed: Sep. 25, 2007

(65) Prior Publication Data

US 2008/0076485 A1    Mar. 27, 2008

(30) Foreign Application Priority Data

Sep. 27, 2006   (KR) .................. 10-2006-0094382

(51) Int. Cl.
*H04M 1/00*   (2006.01)
*H04W 52/02*  (2009.01)

(52) U.S. Cl.
CPC .................................. *H04W 52/029* (2013.01)
USPC .......... 455/574; 455/572; 455/127.3; 370/311

(58) Field of Classification Search
CPC ....................... H04W 52/0287; H04W 52/029
USPC ........ 455/343.1–343.6, 572–574, 334, 426.1, 455/434, 458, 515, 567; 370/311, 310
See application file for complete search history.

(56) References Cited

U.S. PATENT DOCUMENTS

| | | | |
|---|---|---|---|
| 6,725,060 B1 * | 4/2004 | Chhatriwala et al. | 455/556.2 |
| 7,319,680 B2 * | 1/2008 | Cho | 370/329 |
| 2001/0005686 A1 * | 6/2001 | Naito et al. | 455/574 |
| 2001/0044332 A1 * | 11/2001 | Yamada et al. | 455/574 |
| 2003/0022704 A1 | 1/2003 | Lin | |
| 2003/0105983 A1 * | 6/2003 | Brakmo et al. | 713/320 |
| 2004/0121793 A1 * | 6/2004 | Weigele et al. | 455/522 |
| 2004/0132425 A1 * | 7/2004 | Kang et al. | 455/343.1 |
| 2004/0203389 A1 | 10/2004 | Kojima et al. | |
| 2004/0204022 A1 | 10/2004 | Ito et al. | |

(Continued)

FOREIGN PATENT DOCUMENTS

| | | |
|---|---|---|
| KR | 1020060014288 | 2/2006 |
| KR | 100614940 | 8/2006 |
| WO | 2005/114853 A1 | 12/2005 |

OTHER PUBLICATIONS

Korean Notice of Patent Grant dated Oct. 4, 2007 for the corresponding application KR 10-2006-0094382.

*Primary Examiner* — Ronald Eisner
(74) *Attorney, Agent, or Firm* — Ladas & Parry LLP

(57) ABSTRACT

Provided is a method for controlling a low-power state in a mobile handset. The method includes shifting from an active state to a low-power idle state by blocking power of modules for a mobile communication function and decreasing a frequency of a control clock when an inactive request of the mobile communication function is received; shifting from the low-power idle state to a low-power access state by increasing the frequency of the control clock when an additional service request is received; shifting from the low-power access state to the low-power idle state if an additional service request is not received any more; shifting from the low-power idle state to a suspension state by suspending the control clock when request is not received for predetermined time; and shifting from the suspension state to the low-power idle state when the input interrupt and the timer interrupt occur.

14 Claims, 4 Drawing Sheets

(56) References Cited

U.S. PATENT DOCUMENTS

| | | | |
|---|---|---|---|
| 2004/0259540 A1* | 12/2004 | Banerjee et al. | 455/425 |
| 2005/0009496 A1* | 1/2005 | Chen | 455/334 |
| 2005/0233704 A1* | 10/2005 | Maekawa | 455/69 |
| 2005/0250452 A1* | 11/2005 | Walton et al. | 455/63.4 |
| 2005/0286453 A1* | 12/2005 | Gadamsetty et al. | 370/311 |
| 2006/0194623 A1* | 8/2006 | Tanach et al. | 455/574 |
| 2007/0082647 A1* | 4/2007 | Behzad et al. | 455/343.1 |
| 2007/0190964 A1* | 8/2007 | Edwards et al. | 455/343.1 |
| 2008/0305839 A1* | 12/2008 | Karaoguz et al. | 455/574 |

* cited by examiner

METHOD FOR CONTROLLING LOW-POWER STATE IN MOBILE HANDSET

CROSS-REFERENCE TO RELATED APPLICATIONS

The present invention claims priority of Korean Patent Application No. 10-2006-0094382, filed on Sep. 27, 2006, which is incorporated herein by reference.

BACKGROUND OF THE INVENTION

1. Field of the Invention

The present invention relates to a method for controlling a low-power state in a mobile handset; and, more particularly, to a method for controlling a low-power state in a mobile handset that can provide a low-power state disconnected with a mobile communication network by inactivating a mobile communication function through manipulation of a user and controlling a control clock.

This work was supported by the Information Technology (IT) research and development program of the Korean Ministry of Information and Communication (MIC) and the Korean Institute for Information Technology Advancement (IITA) [2005-S-017-02, "Integrated Development of Ultra Low Power RF/HW/SW SoC"].

2. Description of Related Art

In present invention, a mobile handset is a potable terminal capable of transmitting/receiving voice, messages and video data through a mobile communication network, such as a Personal Communication Service (PCS) terminal, a Personal Digital Assistant (PDA), a smart phone, an International Mobile Telecommunication 2000 (IMT-2000) terminal, a wireless local area network (LAN) terminal.

FIGS. 1 to 2 illustrate state machines of a conventional mobile handset.

As shown in FIG. 1, the state machine of the conventional mobile handset includes a power-off state 100 in which power is not supplied and an active state 110 in which power is supplied and functions are activated.

As shown in FIG. 2, the active state 110 includes a traffic state 111, an access state 112, an idle state and a sleep state 114.

Each of states is shifted by users' manual or control of a power manager which pre-programmed corresponding to the current state of the mobile handset.

In case of Qualcomm MSM 6000 series modem processor, the traffic state 111, the access state 112, the idle state 113 and the sleep state 114 are operated by a 150 MHz control clock.

In addition, the sleep state 114 is a power-saving mode periodically searching a specific slot of a paging channel in predetermined time. In case of a Code Division Multiple Access (CDMA) system, a cycle of one slot is 1.28 seconds and one cycle includes 16 slots. After all, there are a total of 128 cycles and 2048 slots and the CDMA system enters the power-saving mode by setting up an index value for the cycle of slot. The power-saving mode is provided in a Wideband Code Division Multiple Access (WCDMA) and a Global System for Mobile communication (GSM) similarly to the power-saving mode of the CDMA system.

The user of the conventional mobile handset turns off the power of the handset or converts the mode of the handset to a manners mode, e.g., vibration or silence, when the user is in a public place such as a conference room or a theater.

When the power of the conventional mobile handset is turned off, additional functions such as watch, address management, schedule management, camera, voice recording and music playing cannot be provided to the user, and urgent call cannot be received.

In addition, when the user converts the mode of the conventional mobile handset to the manners mode to use the additional functions or not to miss calls in the public place, the user does not answer the received call due to awareness of the public place or hangs off the received call immediately. Actually, though the user does not use the mobile communication function, the power of the mobile handset is consumed for maintaining access to the mobile communication network, and the user is exposed to unnecessarily received calls.

SUMMARY OF THE INVENTION

An embodiment of the present invention is directed to providing a method for controlling a low-power state in a mobile handset that can reduce power consumption and eliminate unnecessary received calls by inactivating a mobile communication function automatically in predetermined time or upon manipulation of a user, controlling a control clock and providing a low-power state, which is a state that the handset is disconnected with a mobile communication network, when the mobile communication function is not necessary or when the user is in a public place which the mobile handset is used for additional functions such as watch, address management, schedule management, camera, voice recording and music playing more than the mobile communication function.

Another embodiment of the present invention is directed to providing a method for controlling a low-power state in a mobile handset that can receive call information such as short messages and absent calls in the low-power state by inactivating a mobile communication function, accessing to the mobile communication network automatically, receiving the call information and performing disconnection of the access.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for controlling a low-power state in a mobile handset, including: shifting from an active state to a low-power idle state by blocking power of modules for a mobile communication function and decreasing a frequency of a control clock when an inactive request of the mobile communication function is received from a user; shifting from the low-power idle state to a low-power access state by increasing the frequency of the control clock when an additional service request is received from the user in the low-power idle state; shifting from the low-power access state to the low-power idle state if the additional service request is not received any more in the low-power access state; shifting from the low-power idle state to a suspension state by setting an input interrupt and a timer interrupt and suspending the control clock when a request from the user is not received for predetermined time in the low-power idle state; and shifting from the suspension state to the low-power idle state when the input interrupt and the timer interrupt occur in the suspension state.

In accordance with another aspect of the present invention, there is provided a mobile handset in a low-power mode that adjusts a clock frequency of a clock generating unit and a power voltage of a controlling unit dynamically and uses an active state and an inactive state of a mobile communication modem different from the conventional mobile handset.

According to the method of the present invention, a mobile handset can provide call information such as short messages and absent calls received by periodically shifting from a mobile communication inactive state to the active state based on manipulation of a user or a power management program and accessing to the mobile communication network.

DESCRIPTION OF SPECIFIC EMBODIMENTS

Other objects and aspects of the invention will become apparent from the following description of the embodiments with reference to the accompanying drawings, which is set forth hereinafter. Also, when it is considered that detailed description on a related art may obscure the points of the present invention unnecessarily in describing the present invention, the description will not be provided herein. Hereinafter, specific embodiments of the present invention will be described with reference to the accompanying drawings.

Figure 1:
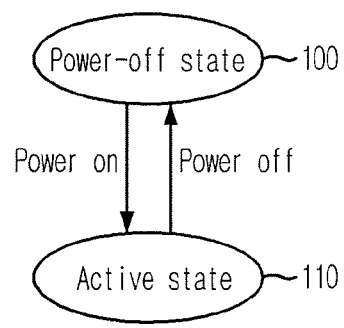
FIGS. 1 to 2 illustrate state machines of a conventional mobile handset.
Figure 2:
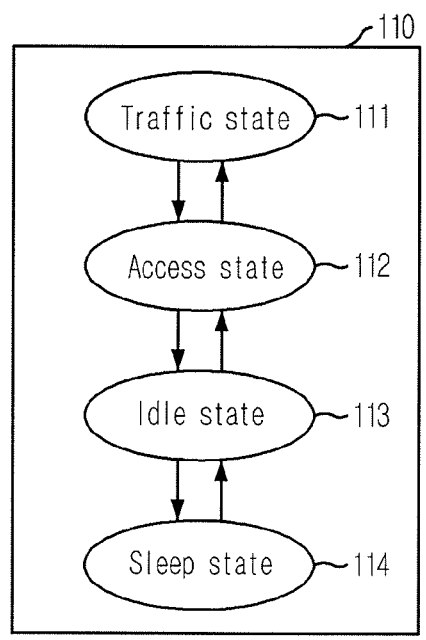
Figure 3:
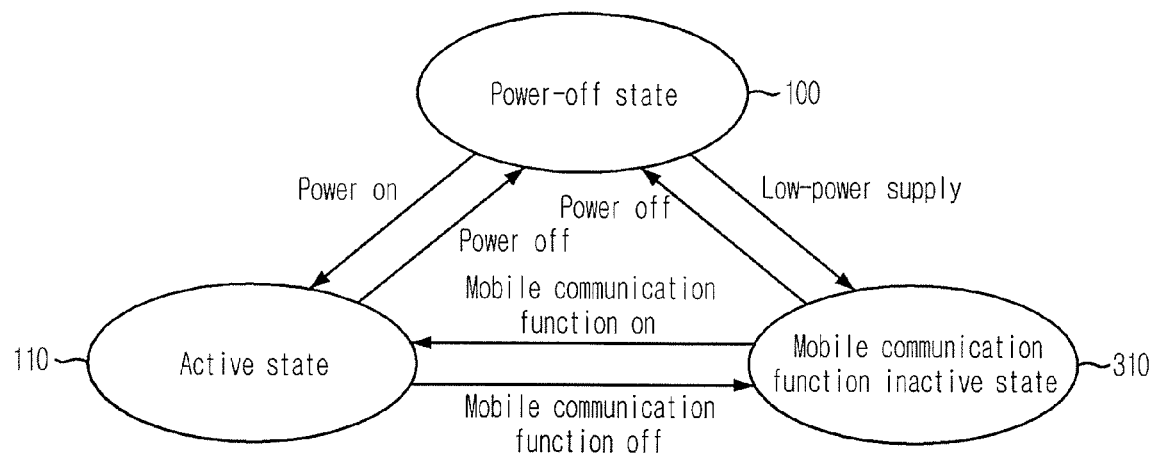
FIG. 3 illustrates a state machine of a mobile handset in accordance with an embodiment of the present invention.

FIG. 3 illustrates a state machine of a mobile handset in accordance with an embodiment of the present invention.

As shown in FIG. 3, the state machine of the mobile handset in accordance with the present invention includes a power-off state 100, an active state 110 and a mobile communication function inactive state 310. Since the power-off state 100 and the active state 110 are the same as those of the conventional handset, additional description of them will be omitted.

A shifting from the mobile communication function inactive state 310 to the active state 110 and vice versa can be performed by inputting a state shifting signal through a separate key in a keypad or by using a graphic user interface (GUI) of a menu.

Here, a shifting method based on the GUI of the menu provides a timer function so that the mobile handset can be kept in the mobile communication function inactive state 310 for a predetermined time, e.g., intensive working time or sleeping time.

Figure 4:
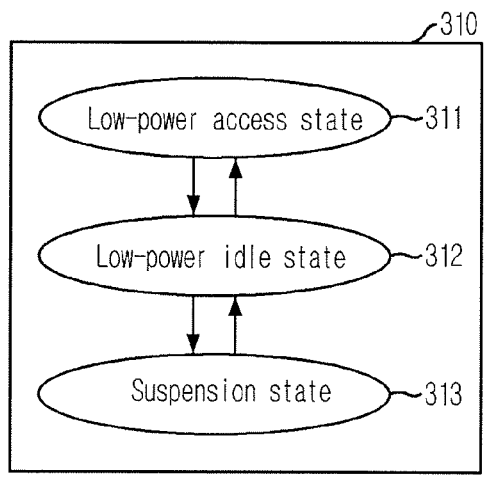
FIG. 4 illustrates a low-power state of a mobile handset in accordance with an embodiment of the present invention.

FIG. 4 illustrates a low-power state of the mobile handset in accordance with an embodiment of the present invention.

As shown, the low-power state of the mobile handset, i.e., the mobile communication function in the active state 310, in accordance with the present invention includes a low-power access state 311, a low-power idle state 312 and a suspension state 313.

Figure 5:
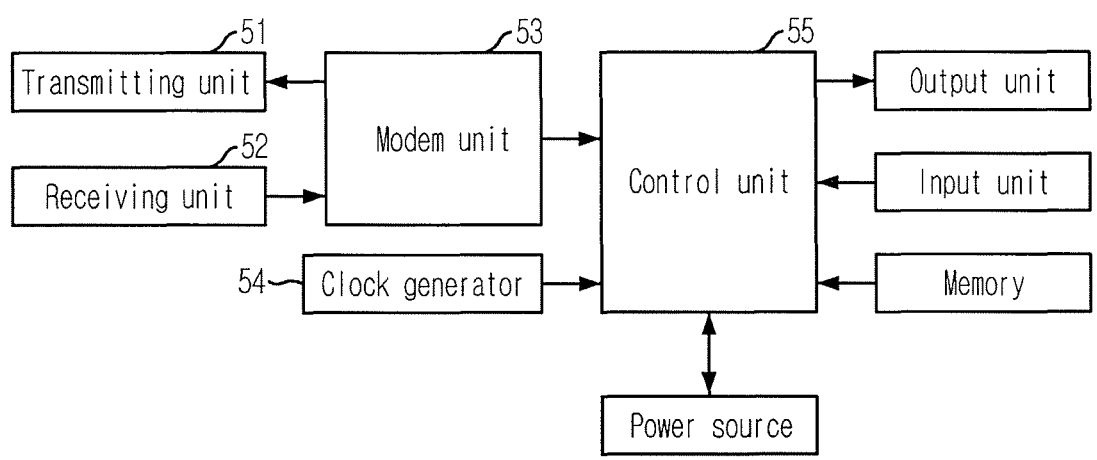
FIG. 5 is a block diagram illustrating a mobile handset to which the present invention is applied.

Referring to FIG. 5, a method for controlling a low-power state of the mobile handset in accordance with the present invention will be described.

As shown in FIG. 5, when a control unit 55 receives a mobile communication function inactive request from a user, the control unit 55 cuts off power supplied to modules such as a transmitting unit 51, a receiving unit 52 and a modem unit 53 for the mobile communication function and is shifted into the low-power idle state 312.

When modules related to the mobile communication function do not operate, a function for accessing to the mobile communication network is inactivated, and the amount of processes handled by the control unit 55 are decreased. Therefore, the control unit 55 shifts an original clock frequency into a lower clock frequency by controlling a clock generator 54. For example, the clock frequency of the low-power access state 311 may range from 50 to 150 MHz; the clock frequency of the low-power idle state 312 may be from 0 to 50 MHz; and the clock frequency of the suspension state 313 is 0 Hz.

Then, the clock frequency and the operation voltage of the control unit 55 are decreased. Since the power consumption is proportional to the clock frequency and square of the operation voltage, the low-power state consumes a smaller amount of power than the active state.

Then, when an additional function service request is received from the user in the low-power idle state 312, the control unit 55 of the mobile handset is shifted into the low-power access state 311. Here, the control unit 55 shifts clock frequency of the clock generator 54 to the original frequency and provides the additional function service upon receipt of a user's request.

The, if a request is not received from the user for predetermined time in the low-power idle state 312, the control unit 55 is shifted into the suspension state 313. The control unit 55 of the mobile handset suspends the mobile communication function and additional functions, sets an input interrupt receiving key inputs from the user and a timer interrupt and suspends the clock frequency of the clock generator 54. Since almost functions of the mobile handset are suspended in the suspension state 313, power is scarcely consumed.

After, when the input interrupt occurs upon receipt of an input from the user, the control unit 55 shifts from the suspension state to the low-power idle state 312.

In addition, the mobile handset of the present invention cannot receive urgent calls in the mobile communication function inactive state, and when the user forgets to convert into the active state, the mobile handset can be the mobile communication function inactive state for very long time. In order to preventing this, the mobile handset may receive the call information such as short messages and absent calls in the mobile communication function inactive state.

Here, the mobile handset periodically shifts from the mobile communication function inactive state to the active state 110 upon manipulation of a user or a power management program and re-accesses to the mobile communication network for receiving the call information in the mobile communication function inactive state.

In addition, when a period for re-accessing to the mobile communication network comes in the middle of providing of the additional service, the mobile handset shifts from the mobile communication function inactive state 310 to the active state 110. Here, the additional services are still available. When the additional service is terminated, the mobile handset shifts from the active state to the low-power idle state 312.

In the present invention, processes handled by the control unit 55 have characteristics of hard real-time, which is sensitive to real-time performance, in the active state 110, it is desirable that the processes have to be operated at the maximum speed. However, processes handled by the control unit 55 have characteristics of soft real-time, which is not sensitive to real-time performance, in the mobile communication function inactive state, the clock frequency can be dynamically adjusted corresponding to loads.

Figure 6:
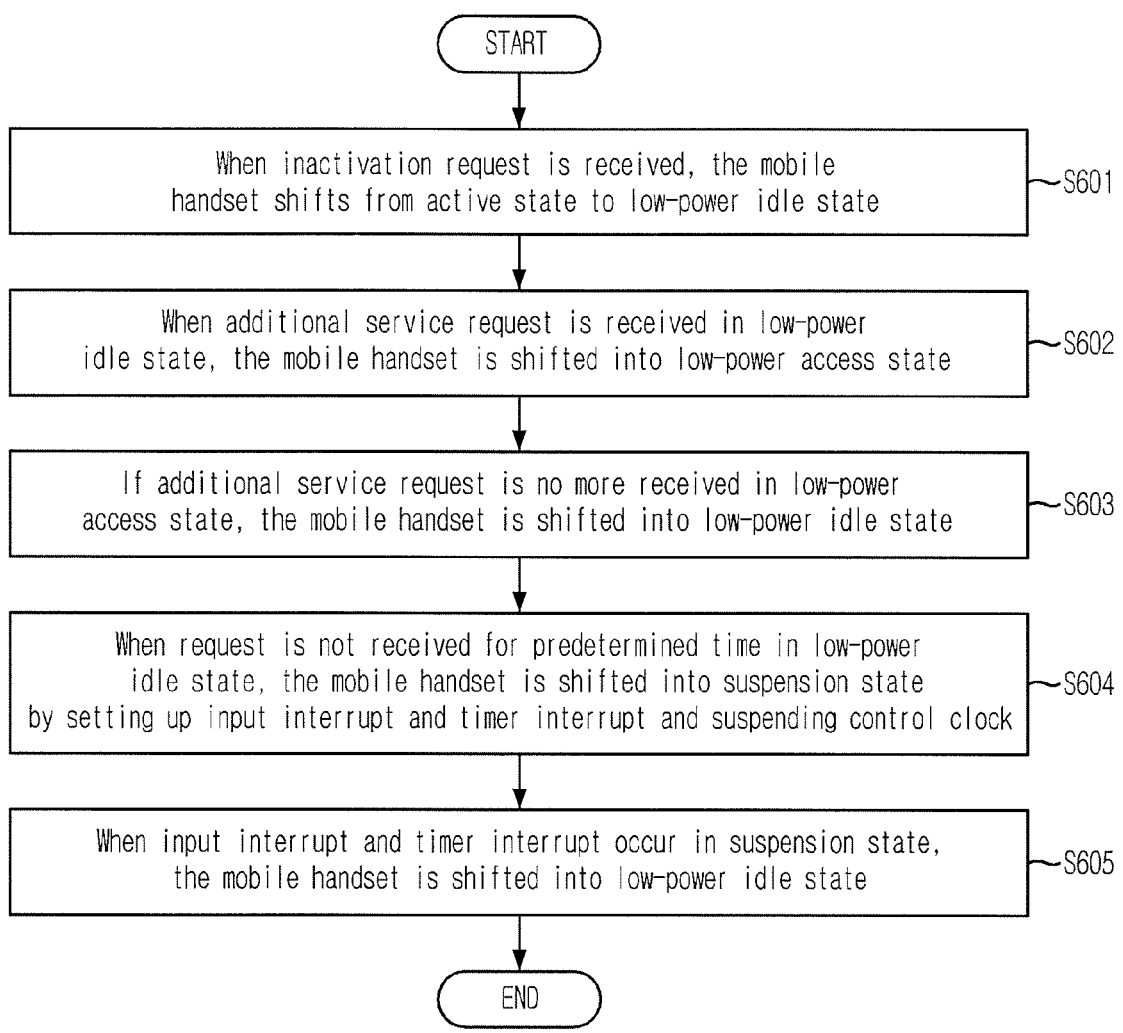
FIG. 6 is a flowchart showing a method for controlling a low-power state of the mobile handset in accordance with an embodiment of the present invention.

FIG. 6 is a flowchart showing a method for controlling a low-power state of the mobile handset in accordance with an embodiment of the present invention.

First, when an inactivate request of a mobile communication functions is received from the user, the mobile handset is shifted into a low-power idle state by blocking power of modules for the mobile communication functions and decreasing frequency of a control clock at step S601.

Then, when an additional service request is received from the user in the low-power idle state, the mobile handset is shifted into the low-power access state by increasing the clock frequency at step S602.

Then, if the additional service request is not received in the low-power access state, the mobile handset is shifted into the low-power idle state at step S603.

Then, when request from the user is not received for predetermined time in the low-power idle state, the mobile handset is shifted into a suspension state by setting up an input interrupt and a timer interrupt and suspending the control clock at step S604.

Then, when the input interrupt and the timer interrupt occur in the suspension state, the mobile handset is shifted into the low-power idle state at step S605.

Meanwhile, when a request from the user is received or when a predetermined period comes in the low-power access state, the low-power idle state and the suspension state, the mobile handset is shifted from the low-power state to the active state, and receives absent messages and absent call records from a base station.

Here, after the mobile handset is shifted into the active state, when the mobile handset does not access to the mobile communication network or does not receive the absent messages and the absent call records after accessing to the mobile communication network, the mobile handset is shifts into the low-power idle state.

The above described method according to the present invention can be embodied as a program and be stored on a computer readable recording medium. The computer readable recording medium is any data storage device that can store data which can be read by the computer system. The computer readable recording medium includes a read-only memory (ROM), a random-access memory (RAM), a CD-ROM, a floppy disk, a hard disk and an optical magnetic disk.

The present invention can reduce power consumption and eliminate unnecessarily received calls by automatically inactivating a mobile communication functions in a predetermined time or upon manipulation of a user, controlling a control clock and providing a low-power state disconnected with a mobile communication network when the mobile communication functions are not necessary or the user is in a public place and the mobile handset is used for additional functions such as watch, address management, schedule management, camera, voice recording and music playing more than the mobile communication function.

Also, the present invention can hold call operation with a small amount of power consumption by activating the mobile communication function of the mobile handset in every predetermined time without user's management and providing access and disconnection with the mobile communication network.

While the present invention has been described with respect to certain preferred embodiments, it will be apparent to those skilled in the art that various changes and modifications may be made without departing from the scope of the invention as defined in the following claims.

What is claimed is:

1. A method for controlling a low-power state in a mobile handset, comprising:
   shifting from an active state to a low-power idle state by blocking power of modules for a mobile communication function and decreasing a frequency of a control clock when an inactive request of the mobile communication function is received from a user;
   shifting from the low-power idle state to a low-power access state by increasing the frequency of the control clock when an additional service request is received from the user in the low-power idle state;
   shifting from the low-power access state to the low-power idle state if the additional service request is not received any more in the low-power access state;
   shifting from the low-power idle state to a suspension state by setting an input interrupt and a timer interrupt and suspending the control clock when a request from the user is not received for predetermined time in the low-power idle state; and
   shifting from the suspension state to the low-power idle state when the input interrupt and the timer interrupt occur in the suspension state.

2. The method as recited in claim 1, further comprising:
   shifting from the low-power access state, the low-power idle state or the suspension state, to the active state at every predetermined period; and
   receiving absent messages and absent call records from a base station.

3. The method as recited in claim 1, further comprising:
   shifting from the low-power access state, the low-power idle state or the suspension state, to the active state when a request from the user is received; and
   receiving absent messages and absent call records from a base station.

4. The method as recited in claim 1, wherein a clock frequency in the low-power access state is from 50 to 150 MHz.

5. The method as recited in claim 4, wherein the clock frequency in the low-power idle state is from 0 to 50 MHz.

6. The method as recited in claim 5, wherein the clock frequency in the suspension state is 0 Hz.

7. An apparatus for controlling a low-power state in a mobile handset, comprising:
   a control unit configured to receive a mobile communication function inactive request from a user, cut off power supplied to modules for the mobile communication function; and
   the modules configured to perform the mobile communication function, and shift into the low-power state by the control unit,
   wherein the low-power state includes a low-power access state, a low-power idle state, and a suspension state,
   wherein the control unit shifts from the low-power access state, the low-power idle state or the suspension state, to an active state at every predetermined period; and receives absent messages and absent call records from a base station,
   wherein the control unit shifts from an active state to the low-power idle state by blocking power of modules for a mobile communication function and decreasing a frequency of a control clock when an inactive request of the mobile communication function is received from a user; shifts from the low-power idle state to the low-power access state by increasing the frequency of the control clock when an additional service request is received from the user in the low-power idle state; shifts from the low-power access state to the low-power idle state if the additional service request is not received any more in the low-power access state; shifts from the low-power idle state to the suspension state by setting an input interrupt and a timer interrupt and suspending the control clock when a request from the user is not received for predetermined time in the low-power idle state; and shifts from the suspension state to the low-power idle state when the input interrupt and the timer interrupt occur in the suspension state.

8. The apparatus as recited in claim 7, wherein a clock frequency in the low-power access state is from 50 to 150 MHz.

9. The apparatus as recited in claim 8, wherein the clock frequency in the low-power idle state is from 0 to 50 MHz.

10. The apparatus as recited in claim 9, wherein the clock frequency in the suspension state is 0 Hz.

11. An apparatus for controlling a low-power state in a mobile handset, comprising:
- a control unit configured to receive a mobile communication function inactive request from a user, cut off power supplied to modules for the mobile communication function; and
- the modules configured to perform the mobile communication function, and shift into the low-power state by the control unit,
- wherein the low-power state includes a low-power access state, a low-power idle state, and a suspension state,
- wherein the control unit shifts from the low-power access state, the low-power idle state or the suspension state, to an active state when a request from the user is received; and receives absent messages and absent call records from a base station,
- wherein the control unit shifts from the active state to the low-power idle state by blocking power of modules for a mobile communication function and decreasing a frequency of a control clock when an inactive request of the mobile communication function is received from a user; shifts from the low-power idle state to the low-power access state by increasing the frequency of the control clock when an additional service request is received from the user in the low-power idle state; shifts from the low-power access state to the low-power idle state if the additional service request is not received any more in the low-power access state; shifts from the low-power idle state to the suspension state by setting an input interrupt and a timer interrupt and suspending the control clock when a request from the user is not received for predetermined time in the low-power idle state; and shifts from the suspension state to the low-power idle state when the input interrupt and the timer interrupt occur in the suspension state.

12. The apparatus as recited in claim 11, wherein a clock frequency in the low-power access state is from 50 to 150 MHz.

13. The apparatus as recited in claim 12, wherein the clock frequency in the low-power idle state is from 0 to 50 MHz.

14. The apparatus as recited in claim 13, wherein the clock frequency in the suspension state is 0 Hz.

* * * * *